Figure 1:
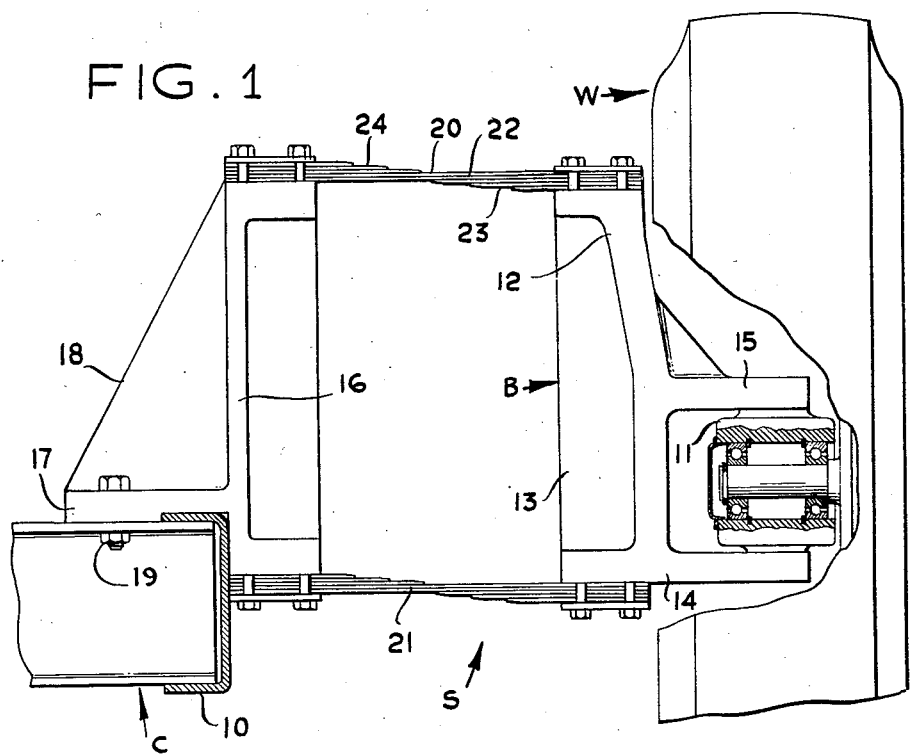

Oct. 16, 1951     K. E. LYMAN     2,571,736

AUTOMOBILE SPRING SUSPENSION

Filed April 19, 1947

INVENTOR
KENNETH E. LYMAN
BY
Toulmin & Toulmin
ATTORNEYS

Patented Oct. 16, 1951

2,571,736

UNITED STATES PATENT OFFICE 2,571,736

AUTOMOBILE SPRING SUSPENSION

Kenneth E. Lyman, Lake Forest, Ill., assignor to Tucker Corporation, Chicago, Ill., a corporation of Delaware Application April 19, 1947, Serial No. 742,584

2 Claims. (Cl. 267—19)

The present invention deals with parallelogram suspensions such as are included in an automobile for the purpose of suspending the chassis from the wheels, and is concerned primarily with a parallelogram suspension of novel design.

In the co-pending application, now abandoned of Kenneth E. Lyman, filed the 19 day of April, 1947, bearing Serial No. 742,583, and entitled "Automobile Spring Suspension," there is illustrated and described a parallelogram suspension which consists essentially of a pair of vertically spaced horizontal spring arms, each of which comprises a leaf spring assembly with its weakest point located at the center. The ends of these arms are mounted at one end and on opposite sides of the bearing block of the wheel, and at the other ends are correspondingly spaced by a bracket carried on the chassis.

With such an arangement the degree of spacing between the arms is held within certain limits as determined by the dimensions of the bearing block.

The present invention has in view as its foremost objective the provision, in a parallelogram suspension of the type indicated, of means for permitting a wider spacing of the suspension arms. It has been found that under certain conditions this wider spacing affords definite advantages in improved spring action, as it gives what is in effect a greater lever arm for one spring as it affects the other.

A further object of the invention is to provide, in a parallelogram suspension of the character indicated, a bracket which is adapted to be mounted on the bearing block of the wheel, and which includes a part extending appreciably above this bearing block. A bracket of corresponding dimension is mounted on the chassis and the spring suspension arms are connected to the outer ends of these brackets.

It is important to note that in providing for this increased spacing of the spring arms, the additional distance must be added above the bearing block rather than below, otherwise the suspension becomes too close to the ground.

A further object is to provide, in a parallelogram suspension, a bracket consisting of a vertical structural member and a pair of horizontal plates outstanding therefrom at one side, one of said plates being located substantially at one end of the bracket.

These and other more detailed advantages and objects of the invention will in part become apparent and in part be hereinafter stated as the description of the invention proceeds.

The invention, therefore, comprises a parallelogram suspension for automobiles, which includes a vertically disposed bracket having means for mounting the same on the bearing block of a wheel, together with a vertical member extending substantially there-above.

Figure 2:
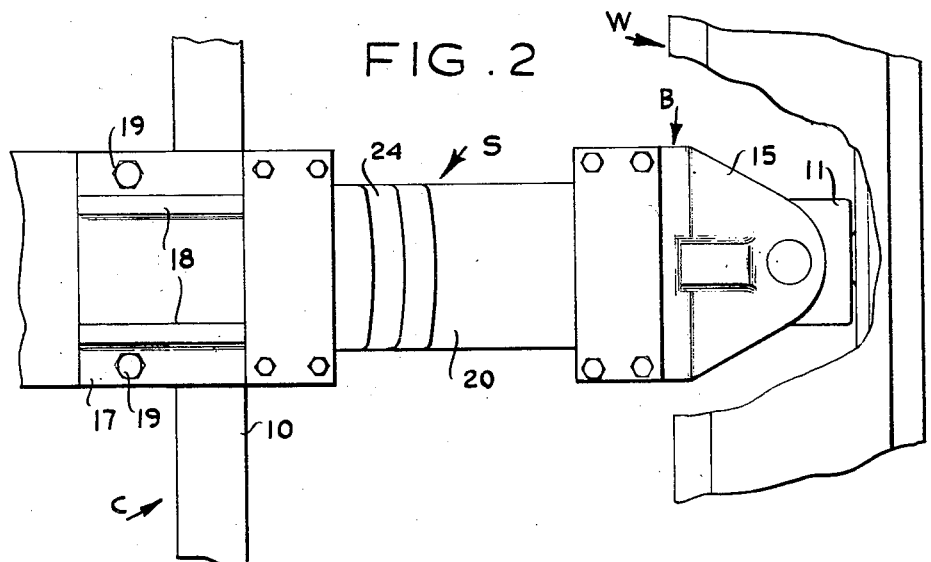

For a full and more complete understanding of the invention, reference may be had to the following description and accompanying drawing, wherein:

Figure 1 is a view in side elevation of a parallelogram suspension designed in accordance with the precepts of this invention. In this view parts of the wheel are broken away and shown in section to more clearly bring out the manner in which the suspension is connected thereto; and Figure 2 is a top plan view of the suspension shown in Figure 1.

Referring now to the drawing wherein like reference characters denote corresponding parts, the chassis of a vehicle is identified generally at C. The chassis C includes a side channel bar 10. The same automobile which includes the chassis C will also include four wheels, one of which is shown at W, the chassis C being suspended from the wheels W by four parallelogram suspensions as will be hereinafter described.

The wheel W includes a bearing block 11 and a parallelogram suspension, which is referred to in its entirety by the reference character S, is mounted at one end on this block 11 and at the other end on the channel bar 10.

A bracket designated generally at B comprises a vertical structural element 12 which may be reinforced by a vertical rib 13. Outstanding from one end of the vertical member 12 is a horizontal plate 14, while a second horizontal plate 15 assumes a corresponding position intermediate the extremities of the vertical part 12.

It will be noted that the bearing block 11 is positioned between the plates 14 and 15, which are anchored thereto. A second bracket 16 includes a vertical structural element corresponding in length to the member 12. This bracket 16 is anchored to the chassis C by the horizontal plate 17 and reinforcing web 18, bolts shown at 19 being employed in a well-known manner.

Extending across the upper ends of the brackets B and 16 is a spring suspension arm 20, which consists of a leaf spring assembly with its weakest point at the center. Likewise, a lower spring arm 21 is connected across the lower ends of the brackets B and 16.

It is not thought necessary to here go into a detailed description of the spring arms 20 and 21, as they are described in the co-pending application above referred to. However, it may be briefly noted that each arm comprises a pair of through leaves 22. On the opposite face of one leaf and on one side of the center there is a series of leaves 23, which gradually diminish in length and which have their ends lying in a common vertical plane. Likewise, a second series of leaves 24 is mounted on the exposed face of the other through leaf, and this second series is also of gradually diminishing length, with their ends lying in a common vertical plane.

It is evident that the extent of the brackets B and 16, as compared to the size of the bearing block 11, affords a wide spacing between the spring arms 20 and 21. This means that these brackets function as a long lever arm in a manner in which one spring affects the other.

As the automobile in which this structure is included rides along the road and irregularities in the road surface are encountered, the wheel W will move vertically with respect to the chassis C. However, this movement is accommodated by the parallelogram suspension, and at the same time the wheel W will be maintained in a substantially vertical position.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In an automobile including a chassis and a wheel having a bearing block, a parallelogram suspension for suspending said chassis from said wheel, said suspension comprising a vertically arranged bracket carried by said block, said bracket being connected adjacent its lower end to the block and having a substantial extension there-above, a bracket of corresponding dimensions connected at its lower end to said chassis and having a substantial extension there-above, and horizontal spring arms joining the corresponding ends of said brackets, each of said spring arms consisting of a leaf spring assembly with its weakest point at the center.

2. In an automobile including a chassis and a wheel having a bearing block, a parallelogram suspension for suspending said chassis from said wheel, said suspension comprising a pair of vertically spaced horizontal spring arms each having its weakest point at the center, and a pair of vertically disposed brackets carrying said arms at each end, one of said brackets being secured at its lower end to said chassis and having a substantial extension thereabove and the other at its lower end to said bearing block and having a substantial extension thereabove, said brackets having a vertical extent at least twice as great as the vertical dimension of said bearing block.

KENNETH E. LYMAN.

REFERENCES CITED

The following references are of record in the file of this patent:

UNITED STATES PATENTS

| Number | Name | Date |
|---|---|---|
| 1,732,586 | Oldfield | Oct. 22, 1929 |
| 1,735,708 | Wright | Nov. 12, 1929 |
| 1,920,651 | Mackenzie | Aug. 1, 1933 |
| 2,007,134 | Rosenberg | July 2, 1935 |
| 2,202,665 | Metz | May 28, 1940 |
| 2,260,634 | Mullner | Oct. 28, 1941 |

FOREIGN PATENTS

| Number | Country | Date |
|---|---|---|
| 541,215 | Germany | Jan. 12, 1933 |